US010913884B2

(12) United States Patent
Mack et al.

(10) Patent No.: US 10,913,884 B2
(45) Date of Patent: *Feb. 9, 2021

(54) TEMPERATURE STABILITY OF POLYOLS AND SUGAR ALCOHOLS IN BRINES

(71) Applicant: Tetra Technologies, Inc., Conroe, TX (US)

(72) Inventors: Arthur G. Mack, Conroe, TX (US); Stanley Gunawan, The Woodlands, TX (US); Katrina Schultz, Spring, TX (US)

(73) Assignee: Tetra Technologies, Inc

( * ) Notice: Subject to any disclaimer, the term of this patent is extended or adjusted under 35 U.S.C. 154(b) by 234 days.

This patent is subject to a terminal disclaimer.

(21) Appl. No.: 15/468,802

(22) Filed: Mar. 24, 2017

(65) Prior Publication Data
US 2018/0171198 A1    Jun. 21, 2018

Related U.S. Application Data

(60) Provisional application No. 62/312,845, filed on Mar. 24, 2016.

(51) Int. Cl.
| C09K 8/035 | (2006.01) |
| C09K 8/68 | (2006.01) |
| C09K 8/06 | (2006.01) |
| C09K 8/66 | (2006.01) |
| C09K 8/86 | (2006.01) |
| C09K 8/84 | (2006.01) |
| C09K 8/62 | (2006.01) |
| E21B 21/00 | (2006.01) |
| E21B 43/04 | (2006.01) |
| E21B 43/26 | (2006.01) |
| E21B 43/267 | (2006.01) |
| E21B 47/00 | (2012.01) |

(52) U.S. Cl.
CPC ............... *C09K 8/035* (2013.01); *C09K 8/06* (2013.01); *C09K 8/62* (2013.01); *C09K 8/665* (2013.01); *C09K 8/68* (2013.01); *C09K 8/845* (2013.01); *C09K 8/86* (2013.01); *E21B 21/00* (2013.01); *E21B 43/04* (2013.01); *E21B 43/26* (2013.01); *E21B 43/267* (2013.01); *E21B 47/00* (2013.01); *C09K 2208/22* (2013.01)

(58) Field of Classification Search
CPC combination set(s) only.
See application file for complete search history.

(56) References Cited

U.S. PATENT DOCUMENTS

| 1,911,195 | A | 5/1933 | Kepfer | |
| 2,191,312 | A * | 2/1940 | Cannon | C09K 8/206 507/139 |
| 2,898,294 | A | 8/1959 | Priest et al. | |
| 3,275,552 | A | 9/1966 | Kern et al. | |
| 4,292,183 | A | 9/1981 | Sanders | |
| 4,444,668 | A | 4/1984 | Walker et al. | |
| 4,465,601 | A | 8/1984 | Pasztor, Jr. | |
| 4,486,340 | A | 12/1984 | Glass, Jr. | |
| 4,566,976 | A | 1/1986 | House et al. | |
| 5,076,364 | A | 12/1991 | Hale et al. | |
| 5,330,683 | A | 7/1994 | Sufrin | |
| 5,415,230 | A | 5/1995 | Fisk, Jr. et al. | |
| 5,728,652 | A | 3/1998 | Dobson, Jr. | |
| 5,846,914 | A | 12/1998 | Finkelstein et al. | |
| 6,080,704 | A | 6/2000 | Halliday et al. | |
| 6,100,222 | A | 8/2000 | Vollmer et al. | |
| 6,124,244 | A | 9/2000 | Murphey | |
| 6,489,270 | B1 * | 12/2002 | Vollmer | C09K 8/08 166/292 |
| 6,617,285 | B2 | 9/2003 | Crews | |
| 6,635,604 | B1 | 10/2003 | Halliday et al. | |
| 6,730,234 | B2 | 5/2004 | Symens | |
| 6,843,931 | B2 | 1/2005 | Sapienza | |
| 7,048,961 | B2 | 5/2006 | Knauf | |
| 7,078,370 | B2 | 7/2006 | Crews | |
| 7,306,039 | B2 | 12/2007 | Wang et al. | |
| 7,825,073 | B2 | 11/2010 | Welton | |
| 7,910,524 | B2 | 3/2011 | Welton | |
| 7,960,315 | B2 | 6/2011 | Welton | |
| 8,003,578 | B2 | 8/2011 | Monroe | |
| 8,030,254 | B2 | 10/2011 | Phatak et al. | |
| 8,067,342 | B2 | 11/2011 | Lin et al. | |
| 8,071,059 | B2 | 12/2011 | Filippi et al. | |

(Continued)

FOREIGN PATENT DOCUMENTS

| CN | 106928930 A | 7/2017 |
| EP | 0194254 A1 | 9/1986 |

(Continued)

OTHER PUBLICATIONS https://en.wikipedia.org/w/index.php?title=Aminoethylethanolamine &oldid=738368805 downloaded on Jan. 15, 2020.*
U.S. Appl. No. 15/468,940 Final Office Action dated Jan. 2, 2019 (10 pages). (TETRA1003).
International Search Report and Written Opinion for related PCT application PCT/US2018/057200 dated Dec. 14, 2018. (TETRA1005).
International Search Report and Written Opinion for related PCT application PCT/US2018/057202 dated Jan. 7, 2019. (TETRA1006).
International Search Report and Written Opinion for related PCT application PCT/US2018/057205 dated Dec. 14, 2018. (TETRA1007).
PCT/US2017/023995 International Search Report and Written Opinion dated May 24, 2017; 15 Pgs (TETRA1001).
U.S. Appl. No. 15/791,748 Non-Final Office Action dated Feb. 25, 2019 (21 pages) (TETRA1005).

(Continued)

Primary Examiner — Kumar R Bhushan
(74) Attorney, Agent, or Firm — Bracewell LLP; Constance R. Rhebergen

(57) ABSTRACT

A stabilized composition for use as a well fluid is provided. The stabilized composition includes a brine, a polyol, the polyol in an amount operable to inhibit solid formation, the polyol further operable to dissolve within the brine; and a stabilization compound, the stabilization compound operable to stabilize the polyol, such that the polyol does not degrade at a bottom hole temperature.

17 Claims, 2 Drawing Sheets

(56) References Cited

U.S. PATENT DOCUMENTS

| | | |
|---|---|---|
| 8,381,537 B2 | 2/2013 | Morita et al. |
| 8,697,611 B2 | 4/2014 | Zhang |
| 8,853,135 B2 | 10/2014 | Phatak et al. |
| 8,936,111 B2 | 1/2015 | Maghrabi et al. |
| 8,950,492 B2 | 2/2015 | Maghrabi et al. |
| 9,593,276 B2 | 3/2017 | Livanec |
| 9,868,890 B2 | 1/2018 | Alleman |
| 2003/0092581 A1 | 5/2003 | Crews |
| 2004/0124013 A1* | 7/2004 | Wiesner .......... C09K 8/08 175/65 |
| 2005/0038199 A1 | 2/2005 | Wang et al. |
| 2005/0101491 A1 | 5/2005 | Vollmer |
| 2005/0253110 A1 | 11/2005 | Chauhan et al. |
| 2008/0093579 A1 | 4/2008 | Knauf |
| 2008/0269081 A1 | 10/2008 | Lin et al. |
| 2009/0048126 A1* | 2/2009 | Phatak .......... C09K 8/685 507/209 |
| 2010/0016180 A1 | 1/2010 | Scoggins et al. |
| 2010/0093565 A1* | 4/2010 | Phatak .......... C09K 8/685 507/219 |
| 2010/0130388 A1 | 5/2010 | Phatak et al. |
| 2010/0163255 A1* | 7/2010 | Horton .......... B01D 53/1468 166/403 |
| 2010/0303737 A1 | 12/2010 | Hurtig |
| 2010/0311621 A1* | 12/2010 | Kesavan .......... C09K 8/08 507/212 |
| 2012/0118569 A1 | 5/2012 | Deville |
| 2013/0098615 A1 | 4/2013 | Perez et al. |
| 2013/0168095 A1 | 7/2013 | Loveless |
| 2013/0231268 A1 | 9/2013 | Ghosh et al. |
| 2014/0148366 A1* | 5/2014 | Reyes Bautista ........ C09K 8/12 507/101 |
| 2014/0221256 A1 | 8/2014 | Holtsclaw et al. |
| 2014/0262283 A1 | 9/2014 | Savari |
| 2014/0352961 A1 | 12/2014 | Dobson, Jr. et al. |
| 2015/0096808 A1 | 4/2015 | Misino et al. |
| 2016/0177698 A1 | 6/2016 | Schultheiss |
| 2016/0208158 A1* | 7/2016 | Monahan .......... C09K 8/035 |
| 2017/0088762 A1 | 3/2017 | Zhang |
| 2017/0145284 A1 | 5/2017 | Davidson |
| 2017/0158939 A1 | 6/2017 | Chen |
| 2017/0158976 A1 | 6/2017 | O'Rear et al. |
| 2017/0190954 A1 | 7/2017 | Schultheiss |
| 2017/0292055 A1 | 10/2017 | Alleman |
| 2018/0016484 A1 | 1/2018 | Ray et al. |

FOREIGN PATENT DOCUMENTS

| | | |
|---|---|---|
| EP | 2463350 A1 | 6/2012 |
| EP | 1863890 B1 | 10/2014 |
| GB | 2250761 A | 6/1992 |
| GB | 2334279 A | 8/1999 |
| JP | 56098482 A | 8/1981 |
| KR | 20040043935 A | 5/2004 |
| WO | 9821291 A1 | 5/1998 |
| WO | 03064555 A1 | 8/2003 |
| WO | 2004050557 A1 | 6/2004 |
| WO | 2009126548 A2 | 10/2009 |
| WO | 20015068865 A1 | 5/2015 |
| WO | 2016025137 A1 | 2/2016 |
| WO | 2017165754 A1 | 9/2017 |

OTHER PUBLICATIONS

Espacenet English Abstract for CN106928930, publication date Jul. 7, 2017, 1 page.

U.S. Appl. No. 15/468,842 Final Office Action dated Apr. 25, 2019 (12 pages) (TETRA1002).

Kaminski, et al., "Clearly Different", Reprinted from Oilfield Technology, Jul. 2012, 4 pgs.

Section B14 Solubility in Non-Aqueous Solvents, Formate Technical Manual, Mar. 2013, 1-4, Version 1, Cabot Specialty Fluids, 4 pgs.

Telang, et al., Effective Inhibition of Mannitol Crystallization in Frozen Solutions by Sodium Chloride, Pharmaceutical Research (Apr. 2003), vol. 20, No. 4, 660-667; 8 pgs.

Chen, et al.; Effect of Cryoprotectants on Eutectics of NaCl 2H2O/ice and KCl/ice Studied by Temperature Wave Analysis and Differential Scanning Calorimetry; Thermochimica Acta 431 (2005) 106-112; 7 pgs.

PCT/US2017/023995 International Search Report and Written Opinion dated May 24, 2017; 15 Pgs.

PCT/US2017/023996 International Search Report and Written Opinion dated May 24, 2017; 16 Pgs.

PCT/US2017/024008 International Search Report and Written Opinion dated May 24, 2017; 16 Pgs.

* cited by examiner

TEMPERATURE STABILITY OF POLYOLS AND SUGAR ALCOHOLS IN BRINES

RELATED APPLICATIONS

This application claims priority from U.S. Provisional Application No. 63/312,845 filed on Mar. 24, 2016. For purposes of United States patent practice, this application incorporates the contents of the provisional application by reference in its entirety.

BACKGROUND

Technical Field

Described are compositions for use as well fluids. More specifically, described are stabilized compositions for use as well fluids that are stable at bottom hole temperatures.

Description of the Related Art

Polyols can be used in a number of well fluids for a variety of purposes. At temperatures above 250° F. polyols can degrade in brines, which can lead to the formation of acid and carbon in the form of char. The acid lowers the pH of the fluid which can cause corrosion and along with the carbon can be damaging to the formation.

Well fluids containing brine can crystallize at temperatures below the true crystallization temperature due to pressures exerted on the fluid. Brines can include monovalent brines, divalent brines, and combinations thereof. Brines are exposed to pressure during well operations. For example, due to hydrostatic head of the brine column in the riser or the well or during BOP (blow out preventer) and surface equipment pressure tests. Conventional methods to reduce the true crystallization temperature of the fluid rely on the use of zinc to prevent crystallization of high density brines (8.4 lb/gal or higher), such as zinc bromide and calcium bromide blend fluids. However, such blend fluids have a low initial pH value and limitations on the ability to adjust the pH of the fluid. In addition, zinc bromide is a pollutant and traces of zinc in the recovered hydrocarbons can cause issues during the refining process.

SUMMARY

Described are compositions for use as well fluids. More specifically, described are stabilized compositions for use as well fluids that are stable at bottom hole temperatures.

In a first aspect, a stabilized composition for use as a well fluid is provided. The stabilized composition includes a brine, a polyol, the polyol in an amount operable to inhibit solid formation, the polyol further operable to dissolve within the brine, and a stabilization compound, the stabilization compound in an amount operable to stabilize the polyol, such that the polyol does not degrade at a bottom hole temperature.

In certain aspects, the brine is a bromide-based brine. In certain aspects, the bromide-based brine comprises calcium bromide, sodium bromide, potassium bromide, magnesium bromide, ammonium bromide and combinations thereof. In certain aspects, the brine is a chloride-based brine. In certain aspects, the chloride-based brine comprises calcium chloride, sodium chloride, potassium chloride, magnesium chloride, ammonium chloride and combinations thereof. In certain aspects, the brine is a combination of a bromide-based brine and a chloride-based brine. In certain aspects, the polyol is selected from the group consisting of a low-molecular weight polyalcohol, a sugar alcohol, and combinations of the same. In certain aspects, the polyol is the low-molecular weight polyalcohol selected from the group consisting of ethylene glycol, propylene glycol, glycerol, polyethylene glycols with molecular weights less than 800 daltons, and combinations thereof. In certain aspects, the polyol is a sugar alcohol selected from the group consisting of sorbitol, xylitol, mannitol, threitol, arabitol, and combinations thereof. In certain aspects, the stabilization compound is an amine base. In certain aspects, the amine base is selected from the group consisting of monoethanolamine (MEA), diethanolamine (DEA), triethanolamine (TEA), ethylenediamine (EDA), diethylenetriamine (DETA), triethylenetetramine (TETA), tetraethylenepentamine (TEPA), pentaethylenetetramine (PETA), pentaethylenehexamine (PEHA), aminoethylpiperazine (AEP), ethyleneamine E-100, piperazine, diethylhydroxylamine (DEHA), diethylaminoethanol (DEAE), dimethylethanolamine (DMEA), methoxypropylamine (MOPA), morpholine, n-aminopropylmorpholine (APM), 4-[2-hydroxyethyl]morpholine, diglycolamine, N-[3-aminopropyl]diethanolamine, aminoethylethanolamine (AEEA), and combinations thereof. In certain aspects, the stabilization compound is present at a concentration between 0.05 vol % to 2 vol %. In certain aspects, the bottom hole temperature is greater than 200° F.

A method of using a stabilized composition in a wellbore as a well fluid in a well activity is provided. The method includes the steps of introducing the stabilized composition into the wellbore. The stabilized composition includes a brine, the brine having a brine density, a polyol, the polyol in an amount operable to inhibit solid formation, the polyol further operable to dissolve within the brine, and a stabilization compound, the stabilization compound operable to stabilize the polyol, such that the polyol does not degrade at a bottom hole temperature. The method further includes the step of engaging in the well activity in the wellbore.

In certain aspects, the well activity is selected from the group consisting of completion activities, packer activities, workover activities, well intervention activities, well abandonment activities, well testing operations, displacement operations, gravel packing operations, frac packing, drilling operations, and fracturing operations.

BRIEF DESCRIPTION OF THE DRAWINGS

These and other features, aspects, and advantages of the embodiments will become better understood with regard to the following descriptions, claims, and accompanying drawings. It is to be noted, however, that the drawings illustrate only several embodiments and are therefore not to be considered limiting of the scope as it can admit to other equally effective embodiments.

DETAILED DESCRIPTION

Figure 1A:
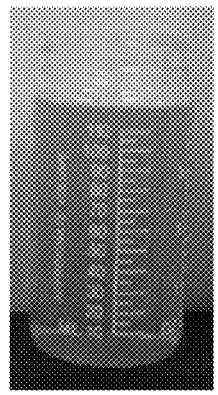
FIG. 1A is a pictorial representation of a sample of a 15.3 ppg $CaBr_2$ with 13.8 wt % sorbitol after 88 hrs aging at 265° F.

While the scope will be described with several embodiments, it is understood that one of ordinary skill in the relevant art will appreciate that many examples, variations and alterations to the apparatus and methods described herein are within the scope and spirit. Accordingly, the exemplary embodiments described herein are set forth without any loss of generality, and without imposing limitations.

Embodiments can include a stabilized composition that includes a brine, a polyol, and a stabilization compound and methods of using the stabilized composition as a well fluid during a well activity.

As used herein, "solid formation" refers to the formation of gas hydrates or crystallization.

As used herein, "gas hydrates" or "clathrate" refers to a solid crystal formed of water gas or gases trapped inside.

As used herein, "crystallization" refers to the formation of crystals in a brine when it cools.

As used herein, "well fluid" refers to a fluid that can be used in a wellbore. Well fluids encompass drilling fluids, completion fluids, packer fluids, and production fluids in well activities.

As used herein, "well activity" refers to completion activities, packer activities, workover activities, well intervention activities, well abandonment activities, well testing operations, displacement operations, gravel packing operations, frac packing, drilling operations, fracturing operations, and the like.

As used herein, "stable" or "stabilize" means that when a composition, component, or compound is stable, the composition, component or compound does not degrade or decompose.

As used herein, "true crystallization temperature" refers to the temperature at which crystals form in a brine at a certain brine density. The true crystallization temperature is defined as the temperature corresponding to the maximum temperature reached following the super-cooling minimum. In a plot of temperature during a cooling cycle, TCT is the maximum temperature reached following the super-cooling minimum or the inflection point in cases with no super-cooling. If there is no super-cooling TCT will equal first crystal to appear (FCTA). TCT is the measured crystallization temperature nearest the temperature at which a brine will naturally crystallize in pumps, lines, filtration units, and tanks. Further described in API Recommended Practice 13J, Testing of Heavy Brines, 5th Ed. October 2014.

As used herein, "bromide-based brine" refers to an aqueous solution that can include calcium bromide, sodium bromide, potassium bromide, magnesium bromide, ammonium bromide, and combinations thereof.

As used herein, "chloride-based brine" refers to an aqueous solution that can include calcium chloride, sodium chloride, potassium chloride, magnesium chloride, ammonium chloride, and combinations thereof.

As used herein, "polyol" or "polyalcohol" refers to any organic compound that has two or more hydroxyl groups.

As used herein, "sugar alcohol" refers to an organic compound derived from sugars. Sugar alcohols, also known as polyhydric alcohols, alditols, and glycitols, are polyols.

Embodiments provide stabilized compositions for use as well fluids with gas hydrate suppression and low true crystallization temperature (TCT). The addition of polyols to a brine inhibits hydrate formation, crystallization, or both hydrate formation and crystallization. The addition of a stabilization compound allows the brine with polyol to be used in high temperature (temperatures above 250° F.) wells. Advantageously, the well fluids described herein are stable at bottom hole temperatures, allowing the well fluids to be used. Advantageously, the addition of a stabilization compound can stabilize a brine that includes a polyol, maintains the pH of the well fluid, and minimizes or eliminates charring. Maintaining the pH in the desired range for the well fluid and well activity is advantageous as it prevents corrosion of equipment, the wellbore, and the formation. The addition of an amine base can stabilize a well fluid of a polyol in a brine allowing the well fluid to be used at higher temperatures than well fluids with polyols in the absence of an amine base.

A stabilized composition for use as a well fluid is provided. A stabilized composition for use as a well fluid includes a brine, a polyol, and a stabilization compound.

The brine can be any bromide-based brine or chloride-based brine operable for use in a well activity. In at least one embodiment, the brine is a bromide-based brine. In at least one embodiment, the bromide-based brine can include calcium bromide, sodium bromide, potassium bromide, magnesium bromide, ammonium bromide, and combinations thereof. In at least one embodiment, the brine is a chloride-based brine. In at least one embodiment, the chloride-based brine can include calcium chloride, sodium chloride, potassium chloride, magnesium chloride, ammonium chloride, and combinations thereof. In at least one embodiment, the brine includes a combination of a bromide-based brine and a chloride-based brine. In at least one embodiment, the brine is in the absence of zinc and zinc salts. The brine can have a brine density selected based on the well activity for which the well fluid is to be used.

The polyol can be any polyol or blend of polyols that can inhibit solid formation. Examples of polyols include low-molecular weight polyalcohols, sugar alcohols, and combinations thereof. Examples of low-molecular weight polyalcohol include ethylene glycol, propylene glycol, glycerol, polyethylene glycols with molecular weight less than 800 daltons, and combinations thereof. Examples of sugar alcohols include sorbitol, xylitol, mannitol, thrietol, arabitol, and combinations thereof. The polyol is added in an amount to inhibit solid formation. The polyol can be present in an amount between 1 wt % and 40 wt %, alternately between 1 wt % and 30 wt %, and alternately between 5 wt % and 30 wt %. The polyol can be added as a solid or as an aqueous solution. The polyol dissolves completely in the brine. In at least one embodiment, the polyol is a blend of low-molecular weight polyalcohols. In at least one embodiment, the polyol is a blend of sugar alcohols. In at least one embodiment, the polyol is a blend of at least one low-molecular weight polyalcohol and at least one sugar alcohol.

The stabilization compound can be any compound operable to stabilize the polyol without reacting with the polyol. The addition of the stabilization compound in the stabilized composition can prevent the polyol from degrading at a bottom hole temperature. In at least one embodiment, the stabilized compound can include an amine base. Examples of amine bases include monoethanolamine (MEA), diethanolamine (DEA), triethanolamine (TEA), ethylenediamine (EDA), diethylenetriamine (DETA), triethylenetetramine (TETA), tetraethylenepentamine (TEPA), pentaethylenetetramine (PETA), pentaethylenehexamine (PEHA), aminoethylpiperazine (AEP), ethyleneamine E-100, piperazine, diethylhydroxylamine (DEHA), diethylaminoethanol (DEAE), dimethylethanolamine (DMEA), methoxypropylamine (MOPA), morpholine, n-aminopropylmorpholine (APM), 4-[2-hydroxyethyl]morpholine, diglycolamine, N-[3-aminopropyl]diethanolamine, aminoethylethanolamine (AEEA), and combinations thereof. Ethyleneamine E-100 is an amine base available from Huntsman corporation. The stabilization compound can be present at a concentration between 0.01 percent by volume (vol %) to 3 vol %, and alternately between 0.1 vol % to 1 vol %. In at least one embodiment, at concentrations below 0.01 vol %, the concentration of stabilization compound is too low to have a stabilizing effect. In at least one embodiment, at concentrations above 3 vol % the brine density can be reduced and the pH can increase such that precipitation can occur. One of skill in the art will understand that for each stabilization compound, the range at which the concentration of stabilization compound can be effective without precipitation can be different, such that in certain embodiments, precipitation can occur at less than 3 vol %. The stabilization compound can be added to the brine at the manufacturing site or at the location of the well activity.

The stabilized composition can be used in a well with a bottom hole temperatures greater than 200° F., alternately greater than 200° F., alternately greater than 300° F., and alternately greater than 400° F.

In at least one embodiment, the stabilization compound includes additives that can be used in well fluids.

Advantageously, embodiments described herein can stabilize the low-molecular weight polyalcohols and the sugar alcohols in a brine, where the low-molecular weight polyalcohols and the sugar alochols have been shown to degrade in brine at a lower temperature than the low-molecular weight polyalcohols and the sugar alcohols alone. Advantageously, the stabilized compound can stabilize sorbitol in a brine, where sorbitol has been shown to degrade in brine at a lower temperature than sorbitol alone.

In at least one embodiment, the stabilized composition includes a calcium bromide brine, sorbitol and monoethanolamine.

In at least one embodiment, the stabilized composition includes a calcium bromide brine, xylitol, and aminoethylethanolamine.

A method of using a stabilized composition in a wellbore as a well fluid in a well activity is provided. The stabilized composition is introduced into the wellbore. The well activity is performed.

EXAMPLES

Example 1

Example 1 compared a stabilized composition to a well fluid without a stabilization compound. Sample 1 contained a calcium bromide brine and sorbitol according to Table 1. Sample 1 represents a well fluid without a stabilization compound and had a density of 15.3 ppg. Sample 2 represents a stabilized composition according to the embodiments described herein and has a density of 15.3 ppg. Sample 2 included an amine base in the composition of Sample 1 as shown in Table 1.

TABLE 1

Composition of Sample 1 and Sample 2 in Example 1.

| Component | Sample 1 | Sample 2 |
|---|---|---|
| Brine-calcium bromide (CaBr$_2$) | 53.8 wt % | 53.8 wt % |
| Water | 32.3 wt % | 32.3 wt % |
| Polyol-Sorbitol | 13.8 wt % | 13.8 wt % |
| Stabilization Compound-MEA | 0 | 0.2 vol % |

Figure 1B:
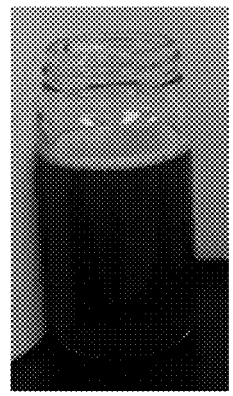
FIG. 1B is a pictorial representation of a sample of 15.3 ppg $CaBr_2$ with 13.8 wt % sorbitol after 7 days aging at 265° F.
Figure 2A:
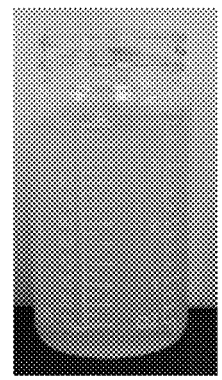
FIG. 2A is a pictorial representation of a sample of 15.3 ppg $CaBr_2$ with 13.8 wt % sorbitol and 0.2 v/v % MEA after 88 hrs aging at 265° F.
Figure 2B:
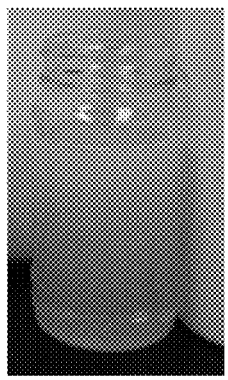
FIG. 2B is a pictorial representation of a sample of 15.3 ppg $CaBr_2$ with 13.8 wt % sorbitol and 0.2 v/v % MEA after 7 days aging at 265° F.

After the samples were mixed, the pH was tested. The samples were then aged at an aging temperature of 265° F. in Teflon™ lined cells for 88 hours and seven (7) days. Aging the samples at the aging temperature simulated a downhole environment. The pH was again tested after aging and the results of the pH tests are shown in Table 2. Sample 1, an example of a well fluid in the absence of a stabilization compound, showed a moderate pH drop after 88 hours at 265° F. and a large pH drop after 7 days as shown in Table 2. FIG. 1A shows sample 1 after 88 hrs aging at 265° F. The resulting fluid after 7 days was extremely dark in color with char-like particles. FIG. 1B shows sample 1 after 7 days aging at 265° F. Sample 2 showed little variation in pH after the 7-day aging. Sample 2, an example of a stabilized composition, showed a relatively stable pH over 7 days at 265° F. with little change in color. FIG. 2A shows sample 2 after 88 hrs aging at 265° F. FIG. 2B shows sample 2 after 7 days aging at 265° F. Example 1 illustrates that the addition of MEA stabilizes the well fluid and minimizes change in pH and color.

TABLE 2

Results of pH after aging of Sample 1 and Sample 2

| | pH Before | pH After 88 hours | pH After 7 days |
|---|---|---|---|
| Sample 1 | 6.30 | 5.81 | 0.68 |
| Sample 2 | 7.26 | 7.02 | 7.06 |

Example 2

Example 2 compared different suppressants and stabilization additives for effectiveness at stabilization. Suppressants were selected from the polyols. Stabilization additives were selected from the stabilization compounds and from aqueous bases. In samples 1-5, a sodium bromide brine was used. In samples 6-8, a calcium bromide brine was used. Sample 1 with a density of 13.0 ppg contained sorbitol as the polyol and did not include a stabilization additive. Sample 2 with a density of 13.0 ppg contained sorbitol as the polyol and MEA, a stabilization compound, as the stabilization additive. Sample 3 with a density of 13.0 ppg contained xylitol as the polyol and did not include a stabilization additive. Sample 4 with a density of 13.0 ppg contained xylitol as the polyol and MEA, a stabilization compound, as the stabilization additive. Sample 5 with a density of 13.0 ppg contained xylitol as the polyol and AEEA, a stabilization compound, as the stabilization additive. Sample 6 was a comparative sample using glycerol as the suppressant and did not include a stabilization additive. Sample 7 included glycerol as the suppressant, and MEA, a stabilization compound, as the stabilization additive. Sample 8 was a comparative sample using a glycerol as the suppressant and an inorganic base, calcium hydroxide ($Ca(OH)_2$), as a stabilization additive to stabilize the well fluid. The composition of each sample is shown in Table 3.

TABLE 3

Compositions of Samples 1-8 in Example 2.

| Component | Brine | Water | Suppressant | Stabilization Additive |
|---|---|---|---|---|
| Sample 1 | 37.7 wt % NaBr | 32.2 wt % | 30 wt % sorbitol | None |
| Sample 2 | 37.7 wt % NaBr | 32.1 wt % | 30 wt % sorbitol | 0.15 vol % MEA |
| Sample 3 | 37.2 wt % NaBr | 32.8 wt % | 30 wt % xylitol | None |
| Sample 4 | 37.2 wt % NaBr | 32.7 wt % | 30 wt % xylitol | 0.15 vol % MEA |
| Sample 5 | 37.7 wt % NaBr | 32.1 wt % | 30 wt % sorbitol | 0.15 vol % AEEA |
| Sample 6 | 53.5 wt % $CaBr_2$ | 37.5 wt % | 9.0 wt % glycerol | None |
| Sample 7 | 53.5 wt % $CaBr_2$ | 37.5 wt % | 9.0 wt % glycerol | 0.15 vol % MEA |
| Sample 8 | 53.5 wt % $CaBr_2$ | 37.5 wt % | 9.0 wt % glycerol | 0.2 wt % $Ca(OH)_2$ |

Figure 3A:
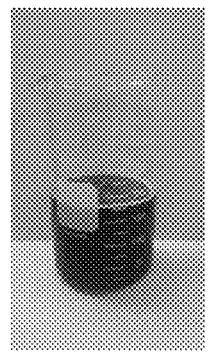
FIG. 3A is a pictorial representation of a sample of 13.0 ppg NaBr with 30 wt % sorbitol after 7 days aging at 350° F.
Figure 3B:
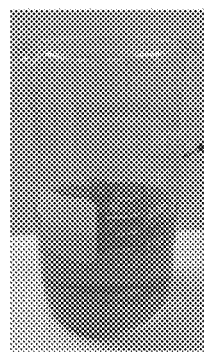
FIG. 3B is a pictorial representation of a sample of 13.0 ppg NaBr with 30 wt % sorbitol and 0.15 v/v % MEA after 7 days aging at 350° F.
Figure 4A:
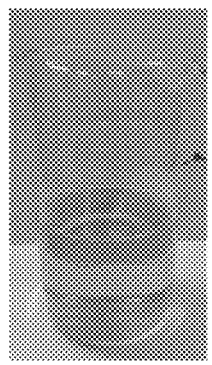
FIG. 4A is a pictorial representation of a sample of 13.0 ppg NaBr with 30 wt % xylitol after 7 days aging at 350° F.
Figure 4B:
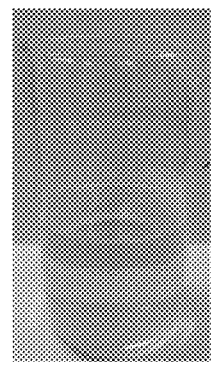
FIG. 4B is a pictorial representation of a sample of 13.0 ppg NaBr with 30 wt % xylitol and 0.15 v/v % MEA after 7 days aging at 350° F.
Figure 5:
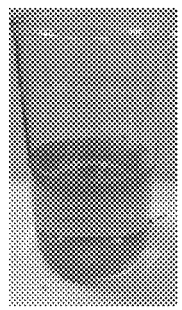
FIG. 5 is a pictorial representation of a sample of 13.0 ppg NaBr with 30 wt % sorbitol and 0.15 v/v % AEEA after 7 days aging at 275° F.
Figure 6A:
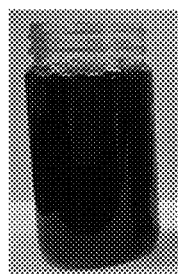
FIG. 6A is a pictorial representation of a sample of 14.8 ppg NaBr with 9 wt % glycerol after 7 days aging at 350° F.
Figure 6B:
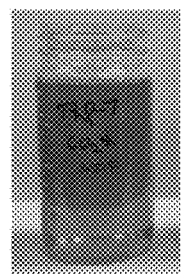
FIG. 6B is a pictorial representation of a sample of 14.8 ppg NaBr with 9 wt % glycerol and 0.15 v/v % MEA after 7 days aging at 350° F.
Figure 6C:
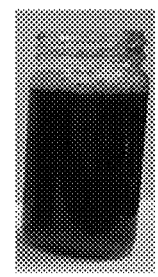
FIG. 6C is a pictorial representation of a sample of 14.8 ppg NaBr with 9 wt % glycerol and 0.2 wt % $Ca(OH)_2$ after 7 days aging at 350° F.

After the samples were mixed, according to the compositions of Table 3, the pH was tested. Samples 1-4 and 6-8 were then aged at an aging temperature of 350° F. and sample 5 was aged at an aging temperature of 275° F. in Teflon™ lined cells for seven (7) days. Aging the samples at the aging temperature simulated a downhole environment. The pH was again tested after aging and the results of the pH tests are in Table 4. Sample 1 showed a slight pH increase after 7 days. The resulting fluid after 7 days was extremely dark in color with char-like particles, as shown in FIG. 3A. Sample 3 showed a slight decrease in pH after 7 days. The resulting fluid was clear. Samples 2 and 4, examples of stabilized compositions according to embodiments described herein, exhibited a relatively stable pH over 7 days at the aging temperature with little change in color, as can be seen in FIGS. 3B and 4B, respectively. FIGS. 3B and 4B show the samples after 7 days of aging at the aging temperature. Sample 5, an example of a stabilized composition according to embodiments described herein, exhibited a relatively stable pH over 7 days and the resulting fluid was clear as shown in FIG. 5. Samples 6 and 7 illustrate that stabilization can occur in glycerol as can be seen in FIG. 6A and FIG. 6b. FIG. 6A shows an unstabilized fluid that is dark in color and demonstrates that that glycerol will decompose without a stabilization compound, Sample 6. FIG. 6B shows the stabilized fluid of Sample 7 which contained a stabilization compound. Sample 8 demonstrates that an inorganic base does not have the same effect as the stabilization compounds described herein, which is indicated by the large drop in pH over 7 days and the resulting fluid is extremely dark in color with char-like particles, as can be seen in FIG. 6C. Example 2 illustrates that amine bases contribute to a relatively stable pH and act as stabilizers for polyols in brines, such that the pH is maintained after exposure to high temperature. Inorganic bases increase the brine pH but do not act as stabilizers for polyols in brines.

TABLE 4

Results of pH after aging of Samples 1-8

| | pH Before | pH After |
|---|---|---|
| Sample 1 | 3.52 | 4.64 |
| Sample 2 | 10.40 | 10.36 |
| Sample 3 | 6.15 | 5.32 |
| Sample 4 | 10.49 | 10.45 |
| Sample 5 | 10.43 | 10.09 |
| Sample 6 | 6.42 | 3.09 |
| Sample 7 | 7.53 | 7.21 |
| Sample 8 | 7.1 | 4.08 |

Samples 6-8, which contained a simpler suppressant as compared to the more complex sugar alcohols, showed the effect of the stabilization additive on a variety of polyols. Sample 8, containing calcium hydroxide, shows that the effect of the stabilization additives is not simply achieved by increasing the pH of the brine.

Although the present embodiments have been described in detail, it should be understood that various changes, substitutions, and alterations can be made hereupon without departing from the principle and scope. Accordingly, the scope should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value and to about another particular value. When such a range is expressed, it is to be understood that another embodiment is from the one particular value and to the other particular value, along with all combinations within said range, inclusive of the end of the range.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope.

What is claimed is:

1. A stabilized composition for use as a well fluid, the stabilized composition comprising:
   a brine;
   a polyol, the polyol present in an amount between 5 wt % and 30 wt % of the stabilized composition, where the amount of polyol is operable to inhibit solid formation, the amount of polyol further operable to dissolve within the brine, wherein the polyol is selected from the group consisting of a low-molecular weight polyalcohol, a sugar alcohol, and combinations thereof; and a stabilization compound present at a concentration between 0.01 vol % to 3 vol % of the stabilized composition, where the concentration of the stabilization compound is operable to stabilize the polyol, such that the polyol does not degrade at a bottom hole temperature and the pH of the stabilized composition is maintained at the bottom hole temperature, wherein the bottom hole temperature is greater than 200° F., wherein the stabilization compound is an amine base wherein the stabilized composition is clear.

2. The stabilized composition of claim 1, wherein the brine is a bromide-based brine.

3. The stabilized composition of claim 2, wherein the bromide-based brine is selected from the group consisting of calcium bromide, sodium bromide, potassium bromide, magnesium bromide, ammonium bromide, and combinations thereof.

4. The stabilized composition of claim 1, wherein the brine is a chloride-based brine.

5. The stabilized composition of claim 4, wherein the chloride-based brine comprises calcium chloride, sodium chloride, potassium chloride, magnesium chloride, ammonium chloride, and combinations thereof.

6. The stabilized composition of claim 1, wherein the brine is a combination of a bromide-based brine and a chloride-based brine.

7. The stabilized composition of claim 1, wherein the polyol is the low-molecular weight polyalcohol selected from the group consisting of ethylene glycol, propylene glycol, glycerol, polyethylene glycols with molecular weights less than 800 daltons, and combinations thereof.

8. The stabilized composition of claim 1, wherein the polyol is the sugar alcohol selected from the group consisting of sorbitol, xylitol, mannitol, threitol, arabitol, and combinations thereof.

9. The stabilized composition of claim 1, wherein the amine base is selected from the group consisting of monoethanolamine (MEA), diethanolamine (DEA), triethanolamine (TEA), ethylenediamine (EDA), diethylenetriamine (DETA), triethylenetetramine (TETA), tetraethylenepentamine (TEPA), pentaethylenehexamine (PEHA), aminoethylpiperazine (AEP), ethyleneamine E-100, piperazine, diethylhydroxylamine (DEHA), diethylaminoethanol (DEAE), dimethylethanolamine (DMEA), methoxypropylamine (MOPA), morpholine, n-aminopropylmorpholine (APM), 4-[2-hydroxyethyl]morpholine, diglycolamine, N-[3-aminopropyl]diethanolamine, aminoethylethanolamine (AEEA), and combinations thereof.

10. A method of using the stabilized composition of claim 1 in a wellbore as the well fluid in a well activity, the method comprising the steps of:

introducing the stabilized composition into the wellbore, and engaging in the well activity in the wellbore.

11. The method of claim 10, wherein the well activity is selected from the group consisting of completion activities, packer activities, workover activities, well intervention activities, well abandonment activities, well testing operations, displacement operations, gravel packing operations, frac packing, drilling operations, and fracturing operations.

12. The method of claim 10, wherein the brine is a bromide-based brine, wherein the bromide-based brine comprises calcium bromide, sodium bromide, potassium bromide, and combinations thereof.

13. The method of claim 10, wherein the brine is a chloride-based brine, wherein the chloride-based brine comprises calcium chloride, sodium chloride, potassium chloride, and combinations thereof.

14. The method of claim 10, wherein the polyol is selected from the group consisting of a low-molecular polyalcohol, a sugar alcohol, and combinations thereof.

15. The method of claim 14, wherein the polyol is the low-molecular weight polyalcohol selected from the group consisting of ethylene glycol, propylene glycol, glycerol, polyethylene glycols with molecular weights less than 800 daltons, and combinations thereof.

16. The method of claim 14, wherein the polyol is the sugar alcohol selected from the group consisting of sorbitol, xylitol, mannitol, threitol, arabitol, and combinations thereof.

17. The method of claim 10, wherein the stabilization compound is an amine base, wherein the amine base is selected from the group consisting of monoethanolamine (MEA), diethanolamine (DEA), triethanolamine (TEA), ethylenediamine (EDA), diethylenetriamine (DETA), triethylenetetramine (TETA), tetraethylenepentamine (TEPA), pentaethylenetetramine (PETA), pentaethylenehexamine (PEHA), aminoethylpiperazine (AEP), ethyleneamine E-100, piperazine, diethylhydroxylamine (DEHA), diethylaminoethanol (DEAE), dimethylethanolamine (DMEA), methoxypropylamine (MOPA), morpholine, n-aminopropylmorpholine (APM), 4-[2-hydroxyethyl]morpholine, diglycolamine, N-[3-aminopropyl]diethanolamine, aminoethylethanolamine (AEEA), and combinations thereof.

* * * * *